United States Patent [19]

Bolden

[11] Patent Number: 4,824,137
[45] Date of Patent: Apr. 25, 1989

[54] COLLAPSIBLE CART

[75] Inventor: Ronald J. Bolden, Katy, Tex.

[73] Assignee: USEC, Inc., Winchester, Va.

[21] Appl. No.: 176,667

[22] Filed: Apr. 1, 1988

[51] Int. Cl.$^4$ ............................................. B62B 1/04
[52] U.S. Cl. ................................. 280/652; 16/263;
16/386; 108/55.3; 108/56.1; 280/47.18;
280/47.26; 280/47.33; 280/63; 280/655;
280/659; 403/329
[58] Field of Search .............. 280/652, 653, 655, 656,
280/659, 639, 47.26, 63, 47.18, 47.33, 47.31;
296/35.3, 27; 16/263, 273, 224, 386; 403/108,
329, 330; 108/56.1, 55.1, 55.3, 55.6; 180/68.5

[56] References Cited

U.S. PATENT DOCUMENTS

| 11,606 | 8/1954 | Gates | 16/273 |
|---|---|---|---|
| D. 155,640 | 10/1949 | Stoll | D34/24 |
| D. 178,526 | 8/1956 | Leach et al. | D34/24 |
| D. 180,543 | 7/1957 | Best | D34/24 |
| D. 211,981 | 8/1968 | Kelley | D34/24 |
| D. 246,300 | 11/1977 | Dortch et al. | D12/105 |
| D. 252,264 | 7/1979 | Paterson | D34/25 |
| D. 260,753 | 9/1981 | Partain | D34/24 |
| D. 280,039 | 8/1985 | Strayer | D34/24 |
| D. 288,497 | 2/1987 | Morrissette | D34/24 |
| D. 289,816 | 5/1987 | Morrissette | D34/24 |
| D. 289,817 | 5/1987 | Morrissette | D34/25 |
| D. 292,338 | 10/1987 | Morrissette | D34/24 |
| 2,270,563 | 1/1942 | Schnebelen | 108/68.5 |
| 2,613,307 | 10/1952 | Mirand | 280/652 |
| 2,742,300 | 4/1956 | Carver | 403/329 |
| 3,325,182 | 6/1967 | Kelley | 280/47.19 |
| 3,854,747 | 12/1974 | Johnston | 280/659 |
| 3,982,638 | 9/1976 | Lamson | 108/55.1 |
| 3,985,372 | 10/1976 | Olsson | 280/652 |
| 4,253,677 | 3/1981 | Wissler | 280/40 |
| 4,266,791 | 5/1981 | Myers | 280/37 |
| 4,316,615 | 2/1982 | Willette | 280/47.26 |
| 4,335,897 | 6/1982 | Muller | 280/47.18 |
| 4,339,105 | 7/1982 | Witt | 108/68.5 |
| 4,375,113 | 3/1983 | Ewert | 280/47.24 |
| 4,451,053 | 5/1984 | Allen | 280/47.26 |
| 4,506,897 | 3/1985 | Libit | 280/40 |
| 4,540,196 | 9/1985 | Paping et al. | 280/646 |
| 4,570,958 | 2/1986 | Walker | 280/40 |
| 4,635,956 | 1/1987 | Morrissette | 280/652 |
| 4,669,743 | 6/1987 | Tipke | 280/42 |

Primary Examiner—Charles A. Marmor
Assistant Examiner—Eric Culbreth
Attorney, Agent, or Firm—Cullen, Sloman, Cantor, Grauer, Scott, & Rutherford

[57] ABSTRACT

A collapsible cart comprises a unit frame having a pair of depending front legs at one end and adjacent its other end a transverse axle mounting a pair of wheels. A collapsible basket is removably secured to the frame, and a handle socket centrally underlies and is secured to the frame. A formed handle has one end portion removably nested and secured within the socket, with its other end projecting forwardly.

5 Claims, 3 Drawing Sheets

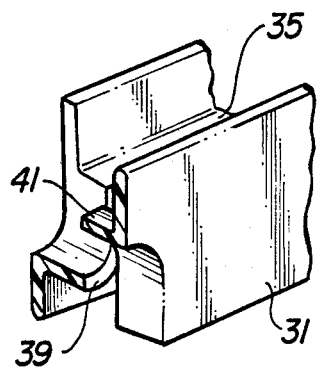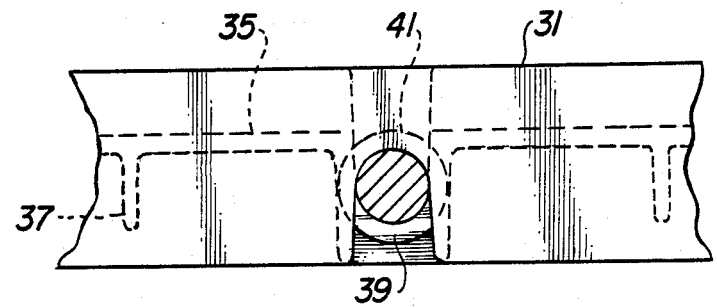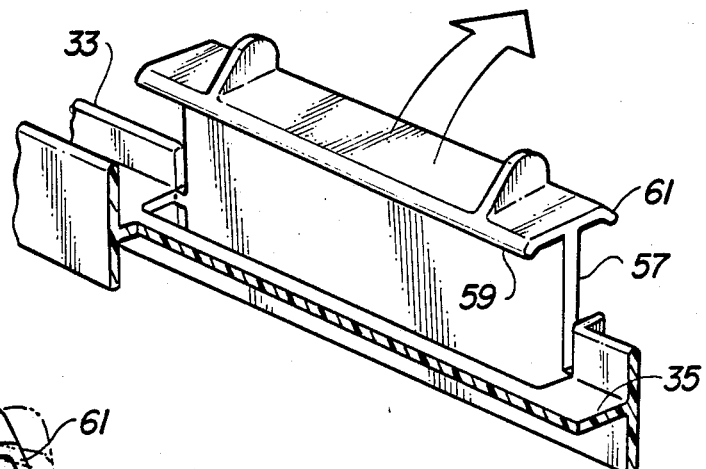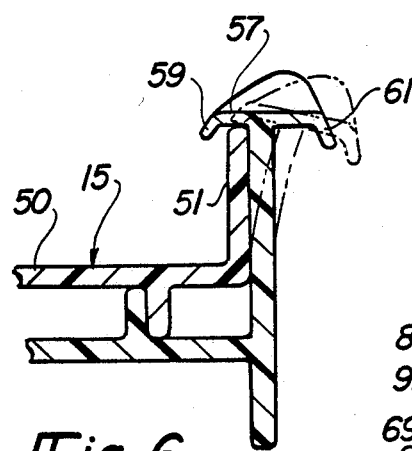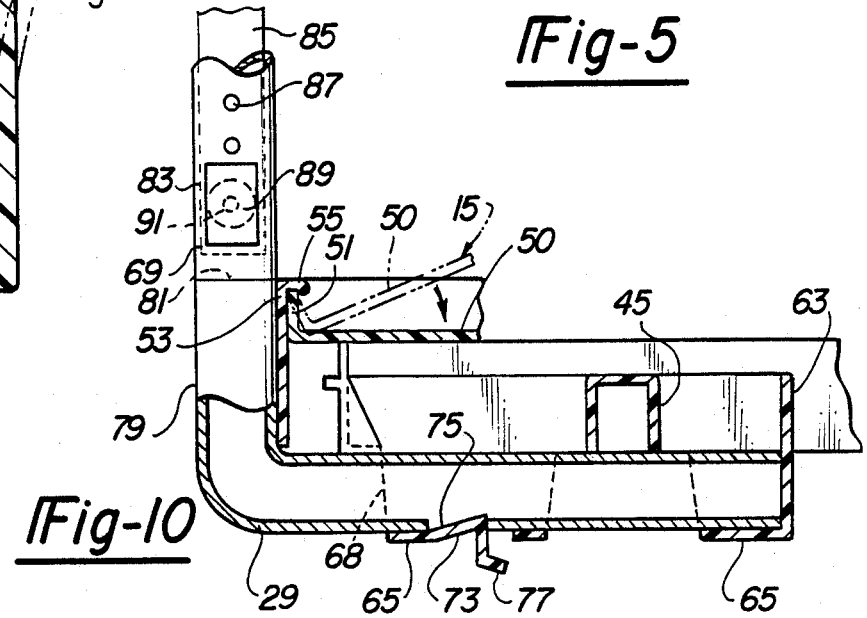

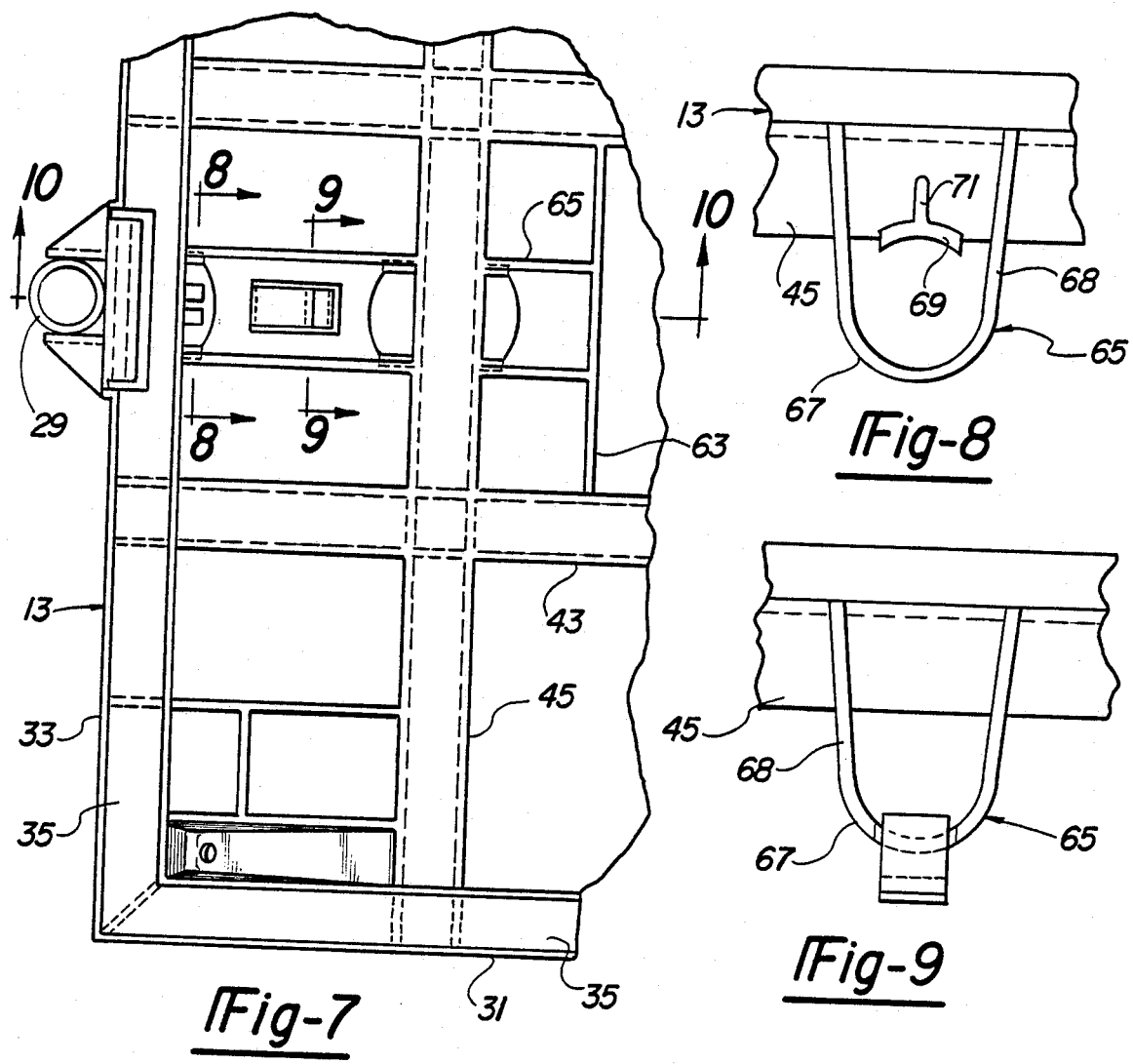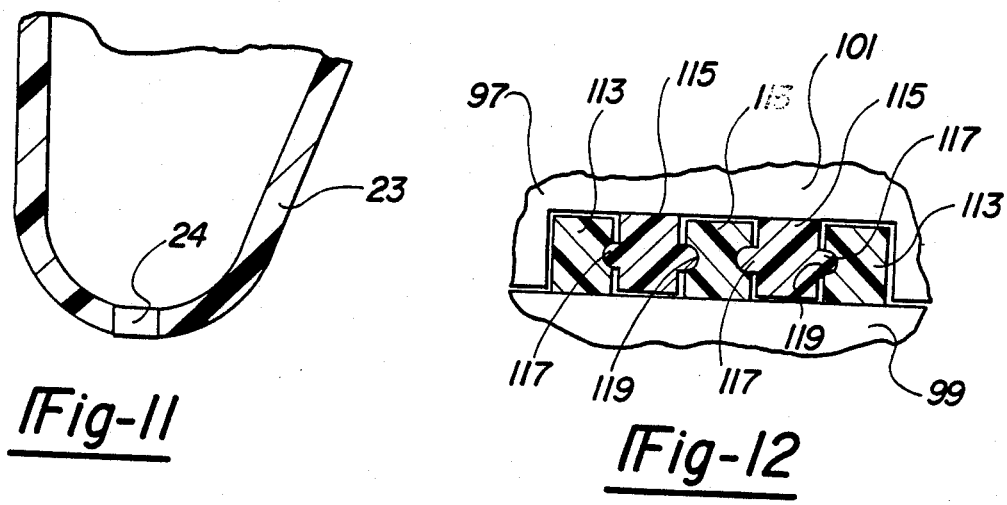

COLLAPSIBLE CART

FIELD OF THE INVENTION

The present invention relates to utility carts with front legs and rear wheels and mounted thereon a basket which may be collapsed to a compact position.

BACKGROUND OF THE INVENTION

Previously, collapsible carts have been used for a variety of purposes. Upon a framework are mounted a pair of wheels and a basket and some form of handle or other support for pulling the cart and for maintaining it in a stationary position.

One of the difficulties with previous carts has been the difficulty in collapsing the cart to a smaller non-use position and wherein it is desirous to have a basket which collapses and a handle which can be separated from the cart for easy packing, shipment and storage.

THE PRIOR ART

Utility carts and collapsible carts are shown in one or more of the following United States patents:

|  | Inventor | Filed |
| --- | --- | --- |
| U.S. Des. Pat. No. | | |
| 155,640 | H. Stoll | October 18, 1949 |
| 178,526 | Leach et al. | August 14, 1956 |
| 180,543 | Best | July 2, 1957 |
| 246,300 | Dortch et al. | November 8, 1977 |
| 252,264 | Paterson | July 3, 1979 |
| 260,753 | Partain | September 15, 1981 |
| 280,039 | Strayer | August 6, 1985 |
| 288,497 | Morrissette | February, 24, 1987 |
| 289,816 | Morrissette | May 12, 1987 |
| 289,817 | Morrissette | May 12, 1987 |
| U.S. Pat. No. | | |
| 3,985,372 | Olsson | October 12, 1976 |
| 4,253,677 | Wissler | March 3, 1981 |
| 4,266,791 | Myers | May 12, 1981 |
| 4,506,897 | Libit | March 26, 1985 |
| 4,540,196 | Paping et al. | September 10, 1985 |
| 4,570,958 | Walker | February 18, 1986 |
| 4,635,956 | Morrissette | January 13, 1987 |

These patents are pertinent and related. Each shows a framework, wheels, stand and a handle.

SUMMARY OF THE INVENTION

An important feature of the present invention is to provide a collapsible cart which comprises a unit molded frame of a plastic material and which includes a pair of laterally spaced front legs at one end of the frame and a transverse axle mounted upon the frame adjacent the other end and projecting therefrom mounting a pair of wheels.

As another feature, a collapsible basket of rectangular shape overlies, is mounted upon and is removably secured to the frame.

As another feature there is provided a handle socket between the legs centrally underlying and removably secured to the frame into which one end of a formed handle is projected and retained and with the other end of the handle projecting forwardly.

As another feature, the present collapsible cart includes a rectangular frame which has opposed side and end channels, a pair of spaced longitudinal frame elements connecting the end channels, and a pair of transverse chords connecting the side channels and frame elements with the channels, frame elements and chords all being coplanar.

As another feature, in the frame for the collapsible cart, the side and end channels are H-shape in cross-section and the chords and frame elements are of inverted U-shape.

As another feature, the frame includes transverse end channels with opposed upstanding basket anchor flanges upon each end channel. Each anchor flange includes a reverse-turned, inwardly-directed retaining lip for operative retaining engagement with an upright end flange upon opposite ends of the basket.

As still another feature, one of the basket anchor flanges is yieldable and has a handle thereon for outward flexing to permit successive entry and separation of the basket end flange into the yieldable anchor flange.

As still another feature, the present frame includes a plurality of transversely aligned axle supports thereon adapted to supportably receive an axle shaft which projects therethrough, extends from opposite sides of the frame and is adapted to receive wheels retained thereon.

As another feature of the present invention, the collapsible basket includes a bottom wall and a top frame. The basket further includes opposed collapsible side walls at their lower ends hinged to the bottom wall, with each side wall including a pair of upper and lower sections pivotally connected together along their length and the upper section along its length pivotally connected to the top frame. A pair of end walls are interposed between opposite ends of the side walls and at their upper ends are pivotally connected to the top frame, and when upright, normally maintain the sidewalls upright, and when pivoted to a horizontal position, permit the side walls to collapse inwardly into surface engagement with the bottom wall.

Another feature is to provide for the pivotal connections for the respective side wall upper and lower sections, end walls, unit frame, top frame, and bottom wall, a plurality of series of longitudinally aligned pivot pins which extend between adjacent apertured portions of the top frame, upper and lower side wall sections, end walls and bottom wall respectively.

As still another feature, these pivotal connections include a series of longitudinally aligned, molded pivot bosses in one of the respective elements of the unit frame, top frame, side wall upper and lower sections, end walls, and with pivot bosses nested and retained within adjacent molded recesses in adjacent portions of the respective members as the sole pivot means therefor.

As still another feature, the securing of the handle socket includes a forwardly opening socket bracket secured upon the underside of the frame centrally thereof between the legs adapted to receive and have retained therein one end of a forwardly extending handle.

As still another feature, within the socket bracket there is positioned a right angular socket with one end removably positioned within the socket bracket and retained therein and with its other end removably connected one end of a formed handle which extends forwardly of the cart.

These and other features and objects will be seen from the following specification and claims in conjunction with the appended drawings.

THE DRAWINGS

FIG. 3 is a fragmentary perspective view of the axle support taken in the direction of arrows 3—3 of FIG. 2 on an increased scale;

FIG. 4 is a fragmentary section taken in the direction of arrows 4—4 of FIG. 2 on an increased scale;

FIG. 5 is a perspective view of the flexible basket anchor flange upon the frame shown circled in FIG. 2 on an increased scale;

FIG. 6 is a fragmentary section taken in the direction of arrows 6—6 of FIG. 2;

FIG. 7 is a fragmentary plan view of the forward end of the frame shown in FIG. 2 on an increased scale;

FIG. 8 is a fragmentary section taken in the direction of arrows 8—8 of FIG. 7 on an increased scale;

FIG. 9 is a fragmentary section taken in the direction of arrows 9—9 of FIG. 7 on an increased scale;

FIG. 10 is a transverse section taken in the direction of arrows 10—10 of FIG. 7 on an increased scale;

FIG. 11 is a fragmentary section taken in the direction of arrows 11—11 of FIG. 1 on an increased scale; and FIG. 12 is a fragmentary section taken in the direction of arrows 12—12 of Figure, illustrating the hinge construction.

DETAILED DESCRIPTION OF AN EMBODIMENT OF THE INVENTION

Figure 1:
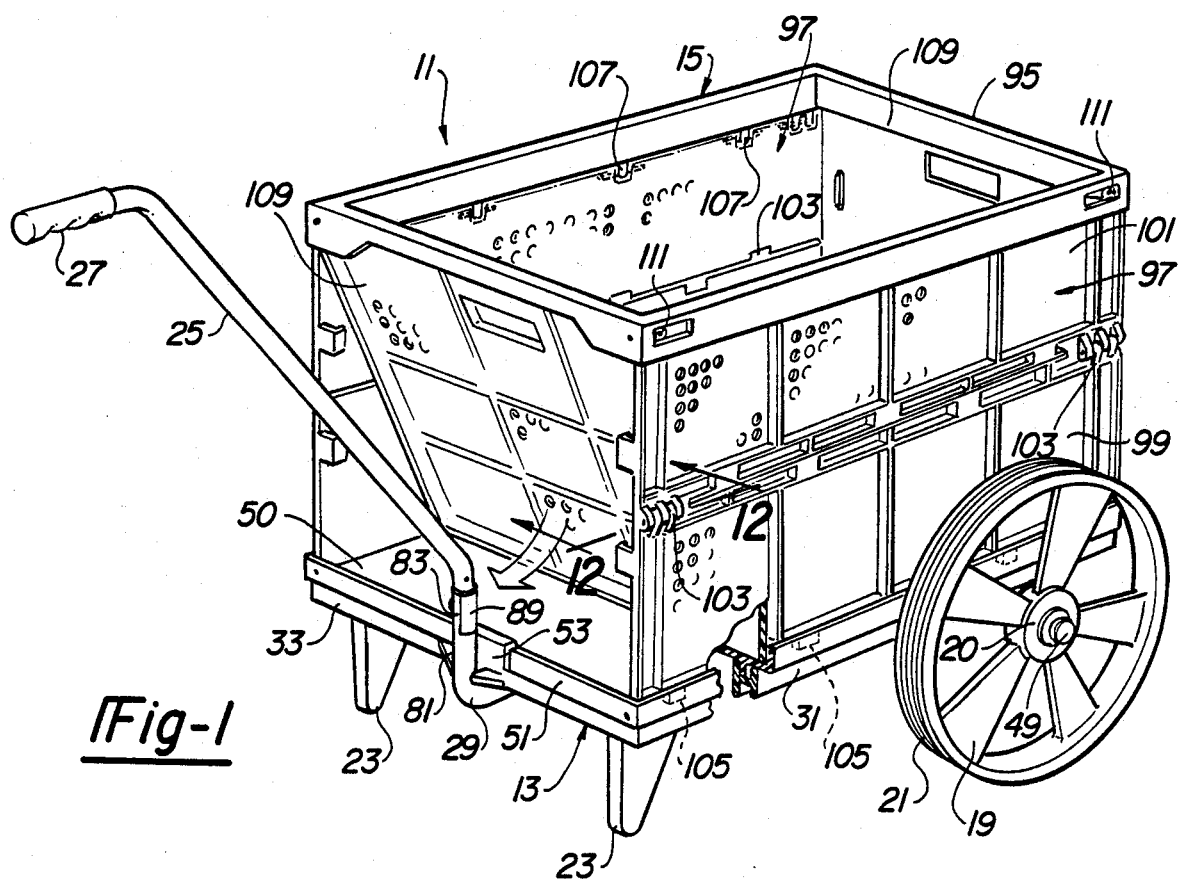
FIG. 1 is a front perspective of the of the present collapsible cart, partly broken away and sectioned.
Figure 2:
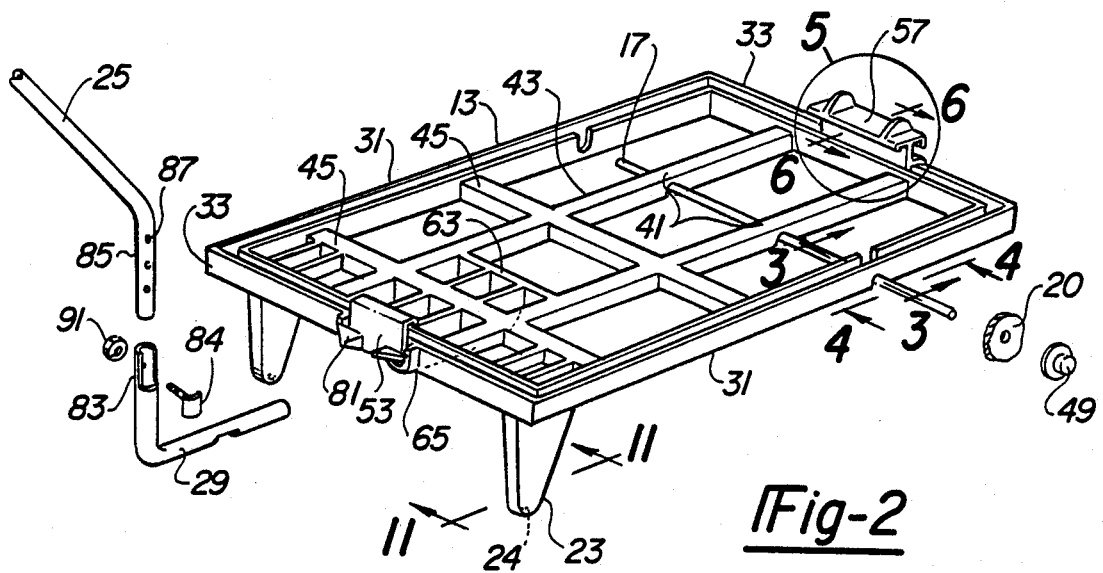
FIG. 2 is an exploded perspective view of the cart frame, axle and handle assembly.

Referring to the drawings, the present utility cart is generally indicated at 11, FIG. 1, and is sometimes referred to as a collapsible utility cart having a unit frame 13, FIG. 2, of rectangular shape. The frame is preferably molded of a plasltic material such as polyethylene or polypropylene. Removably mounted and retained upon the frame is a collapsible basket 15. Its elements are of molded plastic material.

The utility cart includes a transverse axle shaft 17 made of steel or aluminum which projects through a portion of the frame 13 adjacent one end thereof and is adapted to mount and journal over its protecting ends the wheels 19 of a molded plastic material. In the illustrated embodiment, each of the molded wheels 19 includes an integral hub 20, FIG. 1, apertured to be positioned over the projecting ends of axle shaft 17, and retained thereon by conventional Pal Nuts TM 49 or Hat Nuts TM. These fixedly engage the axle ends semipermanently and are frictionally retained thereon. In some cases, the respective hubs include bearings molded thereinto or nested therein for cooperative registry with stationary axle shaft 17. Said nuts are sometimes referred to as Tinnerman TM. Wheels 19 have molded rubber tires 21.

A pair of formed laterally spaced front legs 23 with drain holes 24, FIG. 11, depend from one end of frame 13 as a part thereof and have a height less than the radius of the wheel assemblies 19, 21. A handle socket 29, FIGS. 2 and 10, is arranged between legs 23 centrally thereof, underlies and is secured to frame 13 and projects forwardly of the frame.

The unit molded frame 13, FIG. 2, is generally rectangular in shape and includes a pair of opposed side channels 31 of H-shape in cross-section and a pair of end channels 33 of H-shape in cross-section. Each of said channels includes an intermediate web 35 and a plurality of longitudinally spaced transverse ribs 37.

A plurality of apertured axle supports or saddles 39 of U-shape are formed in the side channels 31 as shown in FIGS. 3 and 4. Additional semicircular axle hold-down members 41 are further formed in the side channels 31.

Frame 19 includes a pair of laterally spaced, longitudinal frame elements 43 which extend between and interconnect the end channels 33. Each of the corresponding frame elements 43 includes a transverse, semicircular axle hold-down member 41 within which is projected and retained axle shaft 17. Frame 13 further includes a pair of longitudinally spaced transverse chords 45 of inverted U-shape which extend between side channels 31 and interconnect the corresponding the frame elements 43 and are coplanar therewith.

In the unit molded frame 13, the respective side channels 31, end channels 33, longitudinal frame elements 43 and the transverse chords 45 are all coplanar providing a uniform seat for the rectangular-shaped collapsible basket 15. Each of the respective molded plastic wheels 19 include a wheel hub 20 which is journaled over the projecting ends of axle shaft 17 upon frame 13 and retained thereon by the nuts 49. Forming a part of the basket is bottom wall 50. At its opposite ends are a pair of upturned end flanges 51, FIGS. 1 and 6.

Mounted upon one end channel 33 as a part thereof and intermediate its ends is an upright basket anchor flange 53 which terminates in the inwardly-directed reverse-turned lip 55 adapted to retainingly receive upper edge portions of the corresponding basket end flange 51, FIGS. 1 and 10. The corresponding opposed second basket anchor flange 57 is sometimes referred to as a yieldable basket anchor flange and includes a reverse-turned retaining lip 59 adapted for retaining registry with the second basket end flange 51 at its opposite end, FIG. 6. Lip 59 of the yieldable basket anchor flange terminates in the hand grip 61 to permit manual outward flexing of anchor flange 57 to facilitate assembly and disassembly of the corresponding basket end flange 51 with respect to flange 57.

Referring to FIGS. 2, 7 and 10, interconnecting the corresponding longitudinal frame elements 43 is a transverse cross plate 63. Extending from said cross plate to the corresponding end channel 33 is a handle socket bracket 65 as a part of the frame arranged centrally between opposite ends of the adjacent end channel, adapted to supportably receive handle socket 29.

The handle socket bracket 65 includes saddle portion 67 semicircular generally with outwardly tapered side walls 68, FIGS. 8 and 9, connected to one of the transverse chords 45 forming a part of frame 13. Molded into the frame as a part of bracket 65 is a socket hold-down receiver 69, FIG. 8, having a central upright support flange 71 which merges with end channel 33 adjacent thereto.

The socket bracket 65, FIG. 10, includes in its lower surface a detent 73 of Z-shape which is adapted to retainingly nest within a rectangular slot 75 formed within an undersurface portion of handle socket 29. One end of detent 73 terminates in the manual release member 77, facilitating assembly and disassembly of the handle socket 29 into bracket 65. In the illustrated embodiment, handle socket 29 is generally right angular in shape and includes an upright socket extension 79, FIG. 10.

Forming a part of frame 13 and projecting downwardly of end channel 33 intermediate its ends are a pair of upright socket retainer flanges 81, FIGS. 2 and 10, adapted to cooperatively receive socket extension 79 retaining it against rotation. The socket extension 79 at its upper portion terminates in a semi-cylindrical flattened end 83, FIGS. 2 and 10, and is adapted to receive and mount the corresponding cylindrical end portion 85 of handle 25 having a hand grip 27. Formed within the mount end 85 of said handle are longitudinally spaced pairs of transverse apertures 87 adapted to selectively receive the bolt 89 which extends through a corresponding aperture in the socket end 83 and through one of the selected pairs of handle apertures 87 for anchoring the handle, as by the fastener or nut 91. As shown in FIG. 10, the head of bolt 89 is arcuate to correspond and register with the semicircular transverse shape of socket extension 83. By this construction and upon removal of fastener 89, the relative height of handle 25 may be adjusted utilizing one of the selected pairs of apertures 87.

COLLAPSIBLE BASKET

The collapsible basket 15, FIGS. 1 and 10, includes a bottom wall 50 which at its ends has the corresponding upturned basket end flanges or strips 51 which provide the means by which the collapsible basket is removably mounted upon frame 13 and secured thereto by the corresponding pair of basket anchor flanges 53 and 57.

The collapsible basket 15 further includes rectangular, hollow top frame 95 and opposed, spaced collapsible side walls 97. Each of the side walls includes a bottom section 99 and a top section 101 with the two sections hinged together along their length by pivot pins 103. The corresponding bottom section 99 is pivotally connected to bottom wall 50 as by the series of aligned pivot pins 105. The top section 101 of the side walls is pivotally connected to top frame 95 by a corresponding series of aligned pivot pins 107. These extend along the length of the top and bottom sections. The collapsible basket further includes a pair of normally upright end walls 109. These at their upper ends are pivotally connected transversely to interior portions of top frame 95 at 111. The remaining portions of said end walls extend between and maintain the collapsible side walls 97 in the upright position shown in FIG. 1.

In order to collapse basket 15 from the position shown in FIG. 1, the respective end walls 109 are pivoted upwardly towards each other within the plane of top frame 95. This permits the corresponding side wall sections 99 and 101 to collapse inwardly along their central pivots 103 with the respective top and bottom sections of the sidewalls moving downwardly into operative engagement with bottom wall 50.

In the collapsed condition of the basket, the corresponding top frame 95 is closely adjacent bottom wall 50 and rests against upper portions of the bottom sections 99 of said side walls. The storage basket 15 may be collapsed to a non-use position or, in some conditions, may be used in its collapsed condition for certain types of loads, such as for carrying bulky items. In the collapsed condition of the basket, the present cart may be stored in a vehicle trunk or upon a patio or garage wall. The basket is of such construction that when open an additional basket may be stacked upon the first basket for transporting and holding more cargo.

In view of the lightweight, molded plastic construction of the collapsible cart, it may be transported anywhere, may be used for picnics and on the beach, for camping, for transporting fishing or boat gear, for shopping, carrying groceroies, and for laundry.

The handle 25 of the cart is easily removable along with socket 29 by flexing the detent 73 in order to withdraw the handle and handle socket from frame bracket 65. Alternately, the handle may be selectively removed from handle socket 79 by removal of the single fastener 89, FIGS. 2 and 10.

Referring to FIG. 12, instead of using pivot pins for the respective hinged portions of basket 15 at 103, 105, 107 and 111, the pivot connections between the hinge elements 113 and 115 are molded projections 117 on one hinge element 115 extending into molded sockets 119 of the adjacent hinge element 113.

Having described my invention, reference should now be had to the following claims.

I claim:

1. A collapsible cart comprising a frame;
   a pair of laterally spaced front legs depending from one end of the frame as a part thereof;
   a transverse axle shaft mounted upon the frame adjacent the other end thereof and projecting therefrom mounting a pair of wheels;
   a collapsible basket of rectangular shape overlying, mounted upon and removably secured to said frame;
   a handle socket between said legs centrally underlying and removably secured to said frame;
   a formed central handle having one end portion aligned with and removably nested and secured within said socket, with its other end projecting forwardly;
   said handle socket being right angular in shape including an upturned handle support having a transverse concave U-shaped portion operatively receiving said one end portion of said handle;
   and a fastener interconnecting said handle support and handle.

2. In the collapsible cart of claim 1, said handle one end having a plurality of longitudinally spaced pairs of apertures therethrough;
   said fastener extending through said handle support and through one of said pairs of apertures for selectively regulating the height of said handle.

3. A collapsible cart comprising a frame;
   a pair of laterally spaced front legs depending from one end of the frame as a part thereof;
   a transverse axle shaft mounted upon the frame adjacent the other end thereof and projecting therefrom mounting a pair of wheels;
   a collapsible basket of rectangular shape overlying, mounted upon and removably secured to said frame;
   a handle socket between said legs centrally underlying and removably secured to said frame;
   a formed central handle having one end portion aligned with and removably nested and secured within said socket, with its other end projecting forwardly;
   the securing of said handle socket including a forwardly opening socket bracket intermediate said legs secured to said frame adjacent said one end thereof;
   said handle socket being removably nested and retained within said bracket;
   the retaining of said socket within said bracket including a resilient yieldable detent on said bracket nested within an aperture in said socket;
   said handle socket being right angular in shape including an upturned handle support having a transversely concave U-shaped portion cooperatively receiving said one end portion of said handle; and a fastener interconnecting said handle support and handle.

4. In the collapsible cart of claim 3, said handle one end having a plurality of longitudinally spaced pairs of apertures therethrough;

said fastener extending through said handle support and through one of said pairs of apertures for selectively regulating the height of said handle.

5. In the collapsible cart of claim 3, and a pair of laterally spaced socket retainer flanges upon said frame extending forwardly thereof, cooperatively receiving and retaining said handle support against rotary movement.

* * * * *